United States Patent
Hosoda et al.

(10) Patent No.: US 7,635,726 B2
(45) Date of Patent: Dec. 22, 2009

(54) METHOD FOR PRODUCING POLYESTER

(75) Inventors: Tomoya Hosoda, Tsukuba (JP); Satoshi Okamoto, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 345 days.

(21) Appl. No.: 11/412,913

(22) Filed: Apr. 28, 2006

(65) Prior Publication Data

US 2006/0293491 A1    Dec. 28, 2006

(30) Foreign Application Priority Data

Jun. 23, 2005  (JP) .............................. 2005-183394

(51) Int. Cl.
*C08G 63/02* (2006.01)
*C08J 3/28* (2006.01)

(52) U.S. Cl. ...................... 522/165; 528/272; 528/308; 528/308.3; 522/63

(58) Field of Classification Search ................. 522/104, 522/179, 63, 165; 528/281, 317.1, 318.1, 528/272, 308, 308.3
See application file for complete search history.

(56) References Cited

U.S. PATENT DOCUMENTS 5,079,289 A * 1/1992 Layton et al. ............... 524/600
6,368,994 B1 * 4/2002 Sklyarevich ................... 502/5
6,515,040 B1 * 2/2003 Scola et al. ................. 522/167
2002/0017451 A1   2/2002 Bonrath et al.
2003/0091487 A1 * 5/2003 Fagrell ....................... 422/198
2005/0096482 A1   5/2005 Tamada et al.

FOREIGN PATENT DOCUMENTS

| JP | 6-1836 | 1/1994 |
|----|--------|--------|
| JP | 7-330667 | 12/1995 |
| JP | 11-246654 | 9/1999 |
| JP | 2004-256561 | 9/2004 |

OTHER PUBLICATIONS

JAP Web Site Machine translation of the "Detailed Description" from JP 11-246654, pp. 1-16, Polyplastics Co., Sep. 14, 1999.*

* cited by examiner

*Primary Examiner*—Susan W Berman
(74) *Attorney, Agent, or Firm*—Foley & Lardner LLP

(57) ABSTRACT

A method for producing a polyester is provided, the method comprising the step of reacting an acylated product of a compound having at least one phenolic hydroxyl group with an aromatic carboxylic acid under microwave irradiation. Polyester can be produced by the method in a relatively short period of time at high temperature with a suppressed thermal hysteresis.

6 Claims, No Drawings

METHOD FOR PRODUCING POLYESTER

BACKGROUND OF THE INVENTION

1. Field of the Invention

The present invention relates to polyester and a producing method thereof.

2. Description of the Related Art

In recent years, liquid crystalline polyester having a backbone with an aromatic ring has been used in the electric and electronic fields as a material superior in heat resistance and tensile strength.

Such liquid crystalline polyester is produced, for example, through transesterification of an acylated product with aromatic dicarboxylic acid such as terephthalic acid, the acylated product being obtained by acylating phenolic hydroxyl groups of aromatic hydroxycarboxylic acid such as para-hydroxybenzoic acid and/or of aromatic diol such as 4,4'-dihydroxybiphenyl with acetic anhydride.

In the above-mentioned producing method, however, a high temperature of 250° C. or more is sometimes required for transesterification, and reaction time tends to be long. Long period of reaction time at a high temperature may cause thermal hysteresis of liquid crystalline polyester. In order to improve the method, various attempts have been made. For example, Japanese Unexamined Patent Publication No. 11-246654 discloses a method of shortening reaction time by adding an organometallic compound such as sodium acetate as a catalyst during acylating reaction, and Japanese Unexamined Patent Publication No. 6-1836 proposes a method of adding a low-boiling-point organic compound such as pyridine as a catalyst during acylating reaction.

However, even in the case of adopting the above-mentioned methods, reaction at a high temperature is needed, and therefore thermal hysteresis of liquid crystalline polyester is not suppressed, which causes thermal degradation of the polyester. Such thermal degradation is notable in the case of obtaining aromatic polyester as compared with the case of obtaining aliphatic polyester.

SUMMARY OF THE INVENTION

One of the objects of the present invention is to provide a method of producing polyester, which can be applicable to the production of aromatic polyester, in which a reaction time can be shortened and the thermal hysteresis of polyester can be suppressed.

The present inventors have found that a reaction under microwave irradiation is effective to achieve the above-mentioned object. The present invention provides a method for producing a polyester, the method comprising the step of reacting an acylated product of a compound having at least one phenolic hydroxyl group with an aromatic carboxylic acid under microwave irradiation.

DETAILED DESCRIPTION OF PREFERRED EMBODIMENTS

In the present invention, reaction time can be dramatically shortened, whereby a polyester with less thermal degradation can be obtained even when the reaction is conducted at a high temperature.

While the reason why reaction time is thus shortened by microwave irradiation is not necessarily clear, it can be inferred that the primary factor is that the irradiation with microwave causes heat generation based on dielectric relaxation in many of an acylated product and aromatic carboxylic acid as starting materials, which are polar compounds (dielectrics) having electric dipole. Another factor may be the merit of selectively penetrating of microwave into dielectrics in a short time, so that it is conceived that rate of reaction can be improved.

In an ordinary polyesterification reaction, the temperature rise of starting materials is performed by external heating from a reaction vessel. On the other hand, in the present invention, materials to be heated themselves can be used as heat generation sources by the irradiation with microwave. Accordingly, in the present invention, even in the case that starting materials needs to be heated at high temperatures, the heating does not become excessive and also thermal degradation of the resulting product is effectively prevented. In addition, even though abnormal heat generation is caused, the stopping of the irradiation with microwave allows temperature rise to be easily prevented and abnormal reaction can be decreased. Furthermore, the irradiation with microwave is hard to cause temperature difference in reactants in a reaction vessel as compared with external heating, so that a product (such as polyester) having high homogeneity can be obtained.

Thus in the present invention, combination of (i) use of an acylated product of a compound having at least one phenolic hydroxyl group as well as an aromatic carboxylic acid with (ii) microwave irradiation at the step of polyesterification provides various effects as described above.

An acylated product to be used in the present invention is preferably an acylated product obtained by acylating at least one phenolic hydroxyl group of an aromatic diol and/or an aromatic hydroxycarboxylic acid with an aliphatic anhydride. An aromatic carboxylic acid to be used in the present invention is preferably an aromatic dicarboxylic acid and/or an aromatic hydroxycarboxylic acid. In has been said that such starting materials need high temperatures particularly for reaction, and thermal degradation is inevitable in a conventional producing method. However, in the present invention, such a thermal degradation can be avoided.

In the present invention, transesterification is preferably caused under microwave irradiation. The resulting product is preferably liquid crystalline polyester and/or a fully aromatic polyester. The present invention allows reaction time of transesterification to be shortened particularly effectively, and the liquid crystalline polyester and the fully aromatic polyester without thermal degradation to be easily obtained.

The reaction of an acylated product of a compound having at least one phenolic hydroxyl group with an aromatic carboxylic acid may comprise melt polycondensation reaction and the following solid-phase polymerization reaction, in which case only the solid-phase polymerization reaction is preferably performed under microwave irradiation. In the case where the reaction comprises melt polycondensation reaction and solid-phase polymerization reaction, the former reaction performs the achievement of higher molecular weight to a certain degree and then the latter reaction further advances the achievement of much higher molecular weight of polyester, so that polyester having high molecular weight can be easily obtained. A conventional method for producing polyester tends to cause decomposition reaction when polyester having high molecular weight continues to be heated, while a method for producing a polyester in the present invention with microwave irradiation during solid-phase polymerization reaction allows reaction time to be shortened even in the case of heating a reactant to high temperatures. Thus, a polyester having high molecular weight as well as less thermal degradation can be obtained in the present invention.

A polyester obtained from a method in the present invention is sufficiently prevented from causing thermal degradation, which enable having a high flow starting temperature as compared with the polyester obtained from a conventional production method, and can sufficiently be applied in electric and electronic fields in which high performance is required.

In the present invention, a method for improving thermal stability of polyester is also provided, the method being performed by a reaction of an acylated product of a compound having at least one phenolic hydroxyl group with an aromatic carboxylic acid under microwave irradiation. The reaction of an acylated product of a compound having phenolic hydroxyl groups with aromatic carboxylic acid may comprise melt polycondensation reaction and the following solid-phase polymerization reaction. In the case where only the solid-phase polymerization reaction is performed under microwave irradiation, the thermal stability of polyester can particularly be improved.

As mentioned above, in the present invention, polyester can be produced by the above-mentioned method in a relatively short period of time at high temperature with a suppressed thermal hysteresis. The method is also applicable to the synthesis of aromatic polyester.

In the present invention, examples of starting materials include an acylated product of a compound having at least one phenolic hydroxyl group and an aromatic carboxylic acid.

The compound having phenolic hydroxyl groups may have at least one phenolic hydroxyl group preferably has one or two phenolic hydroxyl groups from the viewpoint of the reactivity thereof. In the case where a compound having one phenolic hydroxyl group is used, it is preferred that the compound also has one carboxyl group. Particularly preferable examples of the compound having at least phenolic hydroxyl group include an aromatic diol and an aromatic hydroxycarboxylic acid.

Examples of the aromatic diol include 4,4'-dihydroxybiphenyl, hydroquinone, resorcin, methyl hydroquinone, chlorohydroquinone, acetoxyhydroquinone, nitrohydroquinone, 1,4-dihydroxynaphthalene, 1,5-dihydroxynaphthalene, 1,6-dihydroxynaphthalene, 2,6-dihydroxynaphthalene, 2,7-dihydroxynaphthalene, 2,2-bis(4-hydroxyphenyl)propane, 2,2-bis(4-hydroxy-3,5-dimethylphenyl)propane, 2,2-bis(4-hydroxy-3,5-dichlorophenyl)propane, 2,2-bis(4-hydroxy-3-methylphenyl)propane, 2,2-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, bis(4-hydroxy-3-methylphenyl)methane, bis(4-hydroxy-3-chlorophenyl)methane, 1,1-bis(4-hydroxyphenyl)cyclohexane, bis(4-hydroxyphenyl)ketone, bis(4-hydroxy-3,5-dimethylphenyl)ketone, bis(4-hydroxy-3,5-dichlorophenyl)ketone, bis(4-hydroxyphenyl) sulfide and bis(4-hydroxyphenyl) sulfone. These may be used singly or in a combination of two kinds or more.

Among these, 4,4'-dihydroxybiphenyl, hydroquinone, resorcin, 2,6-dihydroxynaphthalene, 2,2-bis(4-hydroxyphenyl)propane and bis(4-hydroxyphenyl)sulfone, which are easily available, are preferably used.

Examples of the aromatic hydroxycarboxylic acid include para-hydroxybenzoic acid, meta-hydroxybenzoic acid, 2-hydroxy-6-naphthoic acid, 2-hydroxy-3-naphthoic acid, 1-hydroxy-4-naphthoic acid, 4-hydroxy-4'-carboxydiphenyl ether, 2,6-dichloro-para-hydroxybenzoic acid, 2-dichloro-para-hydroxybenzoic acid, 2,6-difluoro-para-hydroxybenzoic acid and 4-hydroxy-4'-biphenylcarboxylic acid. These may be used singly or in a combination of two kinds or more.

Among these, para-hydroxybenzoic acid and 2-hydroxy-6-naphthoic acid, which are easily available, are preferably used.

An acylated product to be used in the present invention can be obtained by acylating a compound having at least one phenolic hydroxyl group. Typical examples of the acylated product include an acetylated product, which should not be construed as a limitation upon the scope of the present invention.

The acylation can be conducted by reacting a compound having at least one phenolic hydroxyl group with an acylating agent. Typical examples of the acylating agent include acyl anhydride or halide. An acyl group in an acylating agent can be derived from an aliphatic carboxylic acid such as alkanoic acid (for example, acetic acid, propionic acid, butyric acid and pivalic acid), a higher alkanoic acid such as palmitic acid.

Aliphatic anhydride is particularly preferable as an acylating agent. Examples of aliphatic anhydride include acetic anhydride, propionic anhydride, butyric anhydride, isobutyric anhydride, valeric anhydride, pivalic anhydride, 2-ethyl hexoic anhydride, monochloroacetic anhydride, dichloroacetic anhydride, trichloroacetic anhydride, monobromoacetic anhydride, dibromoacetic anhydride, tribromoacetic anhydride, monofluoroacetic anhydride, difluoroacetic anhydride, trifluoroacetic anhydride, glutaric anhydride, maleic anhydride, succinic anhydride and β-bromopropionic anhydride. These may be used in a mixture of two kinds or more. Acetic anhydride, propionic anhydride, butyric anhydride and isobutyric anhydride are preferably used from the viewpoint of price and handling, and acetic anhydride is used more preferably.

In the acylation of aromatic diol and/or aromatic hydroxycarboxylic acid with aliphatic anhydride, the aliphatic anhydride is preferably used in the amount of 1.0 to 1.2-times equivalent with respect to the phenolic hydroxyl group in aromatic diol and/or aromatic hydroxycarboxylic acid. In the case where the amount of aliphatic anhydride is less than 1.0-time equivalent with respect to the phenolic hydroxyl group, the equilibrium during acylating reaction tends to be shifted to the side of aliphatic anhydride to sublime unreacted aromatic diol or aromatic dicarboxylic acid during polymerization into polyester, which may block up the reaction system. On the other hand, in the case of more than 1.2-times equivalent, the final product polyester (such as a liquid crystalline polyester) tends to be notably colored.

The acylation is preferably reacted at a temperature of 130 to 180° C., more preferably reacted at a temperature of 140 to 160° C. The acylation is preferably conducted for 15 minutes to 20 hours, more preferably for 30 minutes to 5 hours.

The acylating reaction is preferably performed in the presence of a catalyst and/or under microwave irradiation from the viewpoint of shortening reaction time. In the case where a catalyst is used during the acylation, the catalyst does not necessarily need to be removed even after the acylation. That is, the following transesterification with aromatic carboxylic acid can be performed without removing the catalyst to hardly complicate the handling of reaction.

Examples of the catalyst include heterocyclic organic base compounds containing nitrogen atoms by two or more such as N,N-dimethylaminopyridine and 1-methylimidazole. An imidazole compound represented by the formula (1) is particularly useful as heterocyclic organic base compounds containing nitrogen atoms by two or more.

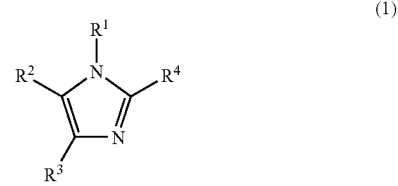

(1)

(In the formula, $R^1$ to $R^4$ denote each independently hydrogen atom, an alkyl group with a carbon number of 1 to 4, a hydroxymethyl group, a cyano group, a cyanoalkyl group with a carbon number of 1 to 4, a cyanoalkoxy group with a carbon number of 1 to 4, a carboxyl group, an amino group, an aminoalkyl group with a carbon number of 1 to 4, an aminoalkoxy group with a carbon number of 1 to 4, a phenyl group, a benzyl group, a phenylpropyl group or a formyl group.)

In the present invention, an acylated product is reacted with an aromatic carboxylic acid. The aromatic carboxylic acid may have one, or two or more carboxyl groups, and is preferably has one or two carboxyl groups from the viewpoint of attaining favorable reactivity. In the case where the aromatic carboxylic acid having one carboxyl group is used, it is preferred that the aromatic carboxylic acid also has one hydroxyl group. Particularly preferable examples of the aromatic carboxylic acid include an aromatic dicarboxylic acid and an aromatic hydroxycarboxylic acid.

Examples of the aromatic dicarboxylic acid include terephthalic acid, isophthalic acid, 2,6-naphthalenedicarboxylic acid, 1,5-naphthalenedicarboxylic acid, 4,4'-biphenyldicarboxylic acid, methylterephthalic acid, methylisophthalic acid, diphenyl ether-4,4'-dicarboxylic acid, diphenyl sulfone-4,4'-dicarboxylic acid, diphenyl ketone-4,4'-dicarboxylic acid and 2,2'-diphenyl propane-4,4'-dicarboxylic acid. These may be used singly or in a combination of two kinds or more.

Among these, terephthalic acid, isophthalic acid or 2,6-naphthalenedicarboxylic acid, which are easily available, are preferably used as aromatic dicarboxylic acid. It is noted that at least 5% by mole of aromatic hydroxycarboxylic acid is preferably contained in the total amount of the acylated product of the compound having at least one phenolic hydroxyl groups and the aromatic carboxylic acid from the viewpoint of coping with both heat resistance and impact resistance in a favorable balance.

In the present invention, an acylated product of a compound having at least one phenolic hydroxyl group and an aromatic carboxylic acid are reacted under microwave irradiation. This reaction is preferably transesterification. The transesterification is preferably conducted by at least two stage reactions which comprises a reaction (melt polycondensation reaction) for obtaining a liquid crystalline polyester in a molten state and a reaction (solid-phase polymerization reaction) for further advancing the polymerization of the polyester obtained in a molten state by applying heat in a solid-phase state to provide a liquid crystalline polyester with a much higher degree of polymerization.

In the present invention, when the transesterification is conducted by the melt polycondensation reaction and the following solid-phase polymerization reaction, microwave irradiation may be employed only in the melt polycondensation reaction, or only in the solid-phase polymerization reaction, or in both of the melt polycondensation reaction and the solid-phase polymerization reaction. The irradiation with microwave is preferably performed in solid-phase polymerization reaction. This is because the irradiation with microwave allows reaction time to be shortened and decomposition of polyester due to heating to be decreased, while a typical solid-phase polymerization reaction by heating has possibility of causing the decomposition.

The reaction (melt polycondensation reaction) for performing transesterification in a molten state may be conducted under microwave irradiation, as follows:

The melt polycondensation reaction is preferably performed under microwave irradiation while heating up at a rate of 0.1 to 50° C./minute in a range of room temperature (about 25° C.) to 350° C., more preferably while heating up at a rate of 0.3 to 5° C./minute in a range of room temperature to 350° C. While the irradiation with microwave at a high temperature in transesterification may shorten the period of time for producing polyester, it is not preferred to conduct the reaction at a temperature of 350° C. or more since thermal degradation of polyester may occur.

On the occasion when an acylated product acylated with aliphatic anhydride and aromatic carboxylic acid are subject to transesterification, a by-produced aliphatic carboxylic acid and unreacted aliphatic anhydride are preferably distilled off outside the reaction system by vaporizing during the reaction. In such a distillation, the equilibrium can be shifted so that the resulting product is favorably produced. In this case, a part of aliphatic carboxylic acid distilled out may be refluxed and returned to a reaction vessel, so that materials vaporized or sublimed with aliphatic carboxylic acid can be condensed or conversely sublimed and returned to a reaction vessel. Thus, for example, precipitated carboxylic acid can be returned to a reaction vessel together with aliphatic carboxylic acid.

In transesterification, the above-described catalyst is used more preferably together with the irradiation with microwave. This allows reaction time to be further shortened. In this case, an imidazole compound represented by the above-mentioned formula (1) is preferable as a catalyst to be used; heterocyclic organic base compounds containing nitrogen atoms by two or more such as N,N-dimethylaminopyridine and 1-methylimidazole are particularly preferable.

The reaction for obtaining a polyester (such as a liquid crystalline polyester) with a high degree of polymerization by applying heat in a solid-phase state, which is a solid-phase polymerization reaction, may be conducted as follows:

In a solid-phase polymerization reaction, a polyester obtained in a molten state, hereinafter referred to as "prepolymer", may be heated in a solid-phase state to advance the polymerization of the polyester, thereby obtaining a polyester having a higher molecular weight. In the solid-phase polymerization, transesterification is proceeded, and therefore, irradiation with microwave allows polymerization time in the solid-phase polymerization to be substantially shortened in the same manner as in melt polycondensation reaction. In the case where the prepolymer is subjected to the solid-phase polymerization under microwave irradiation, it is preferred to heat the prepolymer in the form of powder or pellets thereof.

Microwave and a microwave irradiation device in the present invention are described below. "Microwave" may be electromagnetic wave in a range of electromagnetic spectrum having a frequency of 300 MHz to 30 GHz (thus equivalent to a wavelength of 1 cm to 1 m). Microwave applied in the present invention typically has a frequency of 2.45 GHz, which is not particularly limited.

Power requirement for applying microwave is also not particularly limited and properly selected depending on dielectric properties of starting materials, and mass (weight) and supplied amount of starting materials, and system efficiency. Conventional microwave equipment can be used in the present invention.

In the case of using large-sized microwave equipment, the inside of a reaction vessel may be irradiated with microwave by providing a window made of quartz glass or heat-resistant glass at the top to install an oscillation portion of microwave thereat. When the influence of heat on an oscillation portion is unfavorable, microwave can be leaded from an oscillation portion placed apart from a reaction vessel through a metallic conduit. The irradiation with microwave may be performed under an inert atmosphere, such as nitrogen.

In the present invention, polyester can be produced. The polyester is preferably a liquid crystalline polyester having an aromatic ring skeleton (backbone), which is capable of forming a molten phase having optical anisotropy.

The properties of such a liquid crystalline polyester can be evaluated by measuring the flow starting temperature of the polyester. The flow starting temperature is a temperature at which the liquid crystalline polyester has a melt viscosity of 4,800 Pa·s (48,000 poise) in the case of extruding the liquid crystalline polyester from a nozzle under a load of 9.8 MPa (100 kg/cm$^2$) while heating at a temperature rise of 4° C./minute by using a capillary rheometer on which a die having an inside diameter of 1 mm and a length of 10 mm is mounted. The flow starting temperature of the liquid crystalline polyester is preferably in the range of 260 to 400° C. from the viewpoint of improving heat resistance, more preferably in the range of 270 to 390° C. from the viewpoint of high heat resistance as well as little decomposition degradation during molding.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application No. 2005-183394 filed on Jun. 23, 2005 including specification, claims and summary, are incorporated herein by reference in their entirety.

EXAMPLES

The present invention is described in more detail by following Examples, which should not be construed as a limitation upon the scope of the present invention.

Example 1

Para-hydroxybenzoic acid (911 g; 6.6 mol), 4,4'-dihydroxybiphenyl (409 g; 2.2 mol), isophthalic acid (91 g; 0.55 mol), terephthalic acid (274 g; 1.65 mol) and acetic anhydride (1235 g; 12.1 mol) were charged into a reaction vessel provided with a stirring apparatus, a torquemeter, a nitrogen gas inlet tube, a thermometer and a reflux condenser. After the inside of the reaction vessel was sufficiently substituted with nitrogen gas, 1-methylimidazole (0.17 g) as a catalyst was added to the resulting mixture in the reaction vessel to obtain a reaction liquid. The obtained reaction liquid was heated up to a temperature of 150° C. under nitrogen gas current over 15 minutes, and then was refluxed for 1 hour while maintaining the temperature.

Subsequently, the reaction liquid was heated up to a temperature of 320° C. over 2 hours and 50 minutes, while distilling off the unreacted acetic anhydride and by-produced acetic acid which was distilled out of the reaction liquid, to conduct polycondensation reaction. The torque of the reaction liquid was monitored during this temperature rise. The point of time when the rise of the torque was observed was regarded as completion of the reaction, to discharge a prepolymer produced by the polycondensation out of the reaction vessel. The reaction above corresponded to "melt polycondensation reaction". The flow starting temperature of the obtained prepolymer was 255° C. Thereafter, the prepolymer was cooled to room temperature and then was pulverized by a coarse crusher to obtain powder of the prepolymer (having a particle diameter of approximately 0.1 to 1 mm).

Then, 20 g of powder of the prepolymer obtained above was irradiated with microwave having a frequency output of 1700 W from a state of room temperature (approximately 25° C.) for 5 minutes. The irradiation with microwave was performed using a microwave oven (model: NE-170, manufactured by Matsushita Electric Industrial Co., Ltd., having an oscillatory frequency of 2.45 GHz), which is for business use. After that, the powdery prepolymer was further polymerized to obtain an aromatic liquid crystalline polyester. The reaction under microwave irradiation corresponded to "solid-phase polymerization reaction". The flow starting temperature of the aromatic liquid crystalline polyester was 280° C.

Comparative Example 1

A prepolymer having a flow starting temperature of 255° C. was obtained in the same manner as in Example 1. Subsequently, 20 g of powder of the prepolymer was heated up from 25° C. to 250° C. over 5 minutes by using an inert oven (to conduct solid-phase polymerization), and thereafter was cooled to obtain an aromatic liquid crystalline polyester powder. The flow starting temperature of the aromatic liquid crystalline polyester powder was 255° C.

Comparative Example 2

A prepolymer having a flow starting temperature of 255° C. was obtained in the same manner as in Example 1. Subsequently, 20 g of powder of the prepolymer was heated up from 25° C. to 250° C. over 1 hour by using an inert oven and additionally retained in warmth at the temperature for 3 hours (to conduct solid-phase polymerization), and thereafter was cooled to obtain an aromatic liquid crystalline polyester powder. The flow starting temperature of the aromatic liquid crystalline polyester powder was 278° C.

What is claimed is:

1. A method for producing a liquid crystalline polyester, the method comprising the steps of:
    (i) firstly, conducting a melt polycondensation reaction of at least one acylated product of an aromatic diol and/or an aromatic hydroxycarboxylic acid with an aromatic dicarboxylic acid to obtain a prepolymer thereof; and
    (ii) secondly, conducting solid-phase polymerization reaction of the prepolymer under microwave irradiation to obtain a liquid crystalline polyester with a flow starting temperature in the range of from 260° C. to 400° C.

2. The method according to claim 1, wherein the acylated product is an acylated product obtained by acylating at least one phenolic hydroxyl group of an aromatic diol and/or an aromatic hydroxycarboxylic acid with an aliphatic anhydride.

3. The method according to claim 1, wherein the aromatic carboxylic acid is an aromatic dicarboxylic acid and/or an aromatic hydroxycarboxylic acid.

4. The method of producing according to claim 1, wherein the reaction is transesterification.

5. The method according to claim 1, wherein the polyester is a fully aromatic polyester.

6. A method for improving thermal stability of a liquid crystalline polyester, the method comprising:
    (i) firstly, conducting a melt polycondensation reaction of at least one acylated product of an aromatic diol and/or an aromatic hydroxycarboxylic acid with an aromatic dicarboxylic acid to obtain a prepolymer thereof; and
    (ii) secondly, conducting solid-phase polymerization reaction of the prepolymer under microwave irradiation to obtain a liQuid crystalline polyester with a flow starting temperature in the range of from 260° C. to 400° C.

* * * * *

UNITED STATES PATENT AND TRADEMARK OFFICE
CERTIFICATE OF CORRECTION

PATENT NO. : 7,635,726 B2 Page 1 of 1
APPLICATION NO. : 11/412913
DATED : December 22, 2009
INVENTOR(S) : Hosoda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 427 days.

Signed and Sealed this

Ninth Day of November, 2010

David J. Kappos
*Director of the United States Patent and Trademark Office*